Nov. 18, 1941.  A. S. FLOWERS  2,263,078
RATTRAP
Filed Oct. 19, 1940  2 Sheets-Sheet 2

Inventor
Andrew S. Flowers

By Clarence A. O'Brien

Attorney.

Patented Nov. 18, 1941

2,263,078

UNITED STATES PATENT OFFICE 2,263,078

RATTRAP

Andrew S. Flowers, Brundidge, Ala.

Application October 19, 1940, Serial No. 361,960

1 Claim. (Cl. 43—76)

This invention relates to new and useful improvements in rat traps and more particularly to a trap of the self-resetting type.

The principal object of the present invention is to provide a trap for catching rodents wherein the trapping means is automatically operated by the victims.

Still another important object of the invention is to provide a trap which is of positive action and substantially automatic in operation in all patriculars.

These and other objects and advantages of the invention will become apparent to the reader of the following specification.

Figure 1:
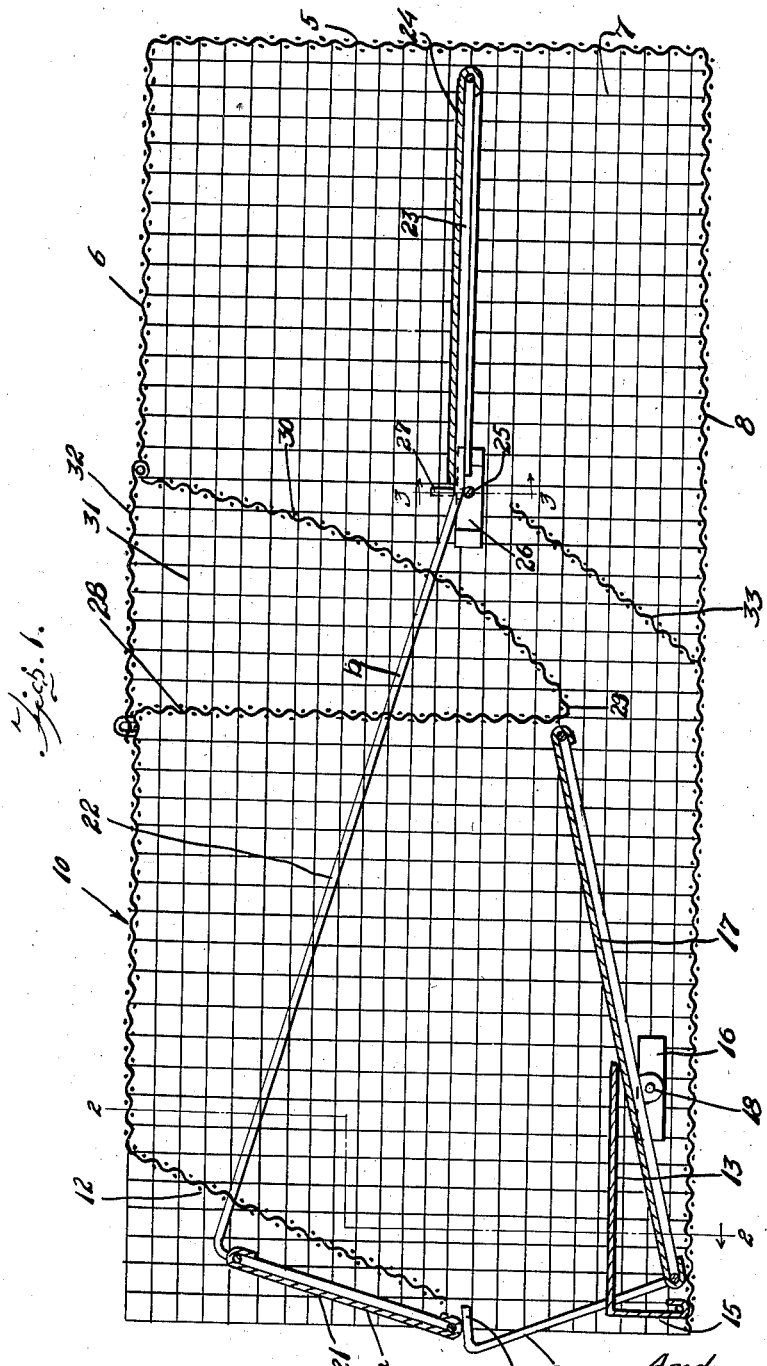
Figure 1 represents a longitudinal sectional view through the trap.
Figure 2:
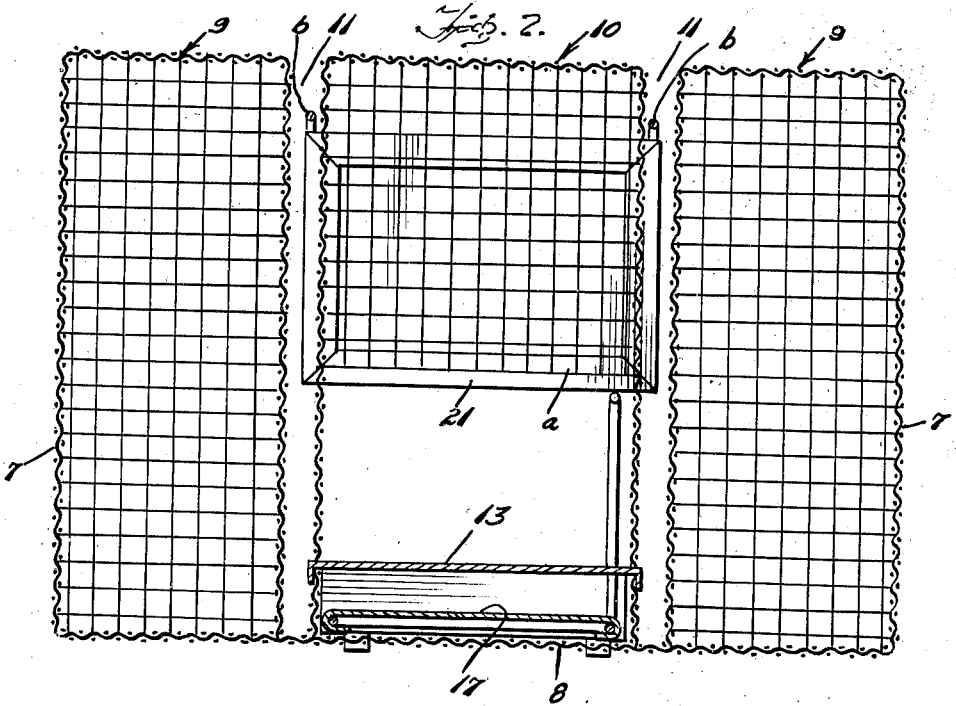
Figure 2 is a transverse sectional view taken substantially on the line 2—2 of Figure 1.
Figure 3:
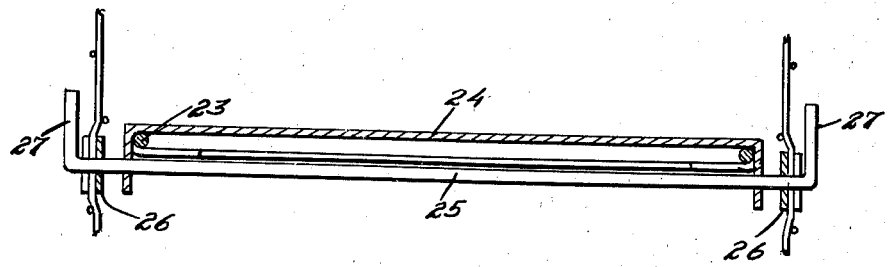
Figure 3 is a fragmentary enlarged transverse sectional view through the closure resetting treadle.

Referring to the drawings wherein like numerals designate like parts, it can be seen that the trap consists of a foraminous enclosure consisting of a back wall 5, a top wall 6, side walls 7 and a bottom wall 8.

The forward end of the trap is divided to provide the corridor-like extensions generally referred to by numerals 9, 9, and a central corridor structure generally referred to by numeral 10. These corridors are spaced to define alleys 11, 11. The forward wall of the corridor structure 10 slopes downwardly as at 12 and terminates a substantial distance upwardly from the bottom 8 to define a rodent entrance.

Inside of this entrance is a stationary platform 13 which has a depending apron 15 at its forword edge. Beneath the platform 13, the side walls of the corridor structure 10 are provided with supporting plates 16 on which the intermediate portion of the rockable closure releasing treadle 17 is fulcrumed as at 18. The forward end of this treadle 17 has an upstanding trip arm 19 provided with an inwardly disposed foot 20 at the upper end thereof. This foot 20 normally supports the gate or closure 21. This gate or closure 21 consists of a plate $a$ the edge portions of which are pressed or otherwise secured against the depending end portion of an elongated frame 22, the side members $b$ of which extend along the alleys 11 and into the rear portion of the trap compartment where an offset extension 23 is provided against which the edge portions of a closure recess treadle 24 are pressed or otherwise secured. A bridge member 25 is soldered or otherwise secured to the side members $b$ of the frame 22 and extend through plates 26 clamped to opposite sides of the foraminous trap enclosure to serve as a shaft, the end portions of this member 25 being bent laterally as at 27 to prevent displacement of the same from the plates 26. Thus the frame 22, treadle 24 and closure 21 are rockably mounted.

It can be seen in Figure 1, that the back wall of the corridor structure 10 extends downwardly as at 28 to terminate as at 29 in spaced relation from the bottom 8 and a wall 30 then extends upwardly to connect to the top 6. This arrangement with the side walls 31 thereof define a bait chamber which has a closure 32 at the top thereof.

A rodent is attracted by the bait in the compartment and moves across the platform 13 onto the treadle 17. His weight depresses the inner end of the treadle 17, releasing the trip arm 19 so that the weight of the closure 21 and major portion of the frame 22 will cause the closure 21 to swing downwardly closing the entrance between the lower portion of the front wall 12 and the bottom 8. The rodent now has passageway along the bottom 8 and up the inclined wall 33 to the treadle 24. As his weight lowers the treadle 24, the closure 21 will be elevated until the lower edge thereof reaches the foot 20, whereupon the arm 19 will move outwardly into a position supporting the closure 21 when the animal jumps off of the treadle 24.

While the foregoing specification sets forth the invention in specific terms, it is to be understood that numerous changes in the shape, size and materials may be resorted to without departing from the spirit and scope of the invention claimed.

Having described the invention, what is claimed as new is:

In a rodent trap, an enclosure having a main chamber and an entrance and a corridor connecting with the entrance, a walled bait chamber located in the enclosure between the main chamber and entrance and defining a passage between the corridor and the main chamber, an upwardly inclined floor in the enclosure and providing an inclined ramp for the passage, a treadle pivoted adjacent one end of the enclosure and located in the corridor between the entrance and the bait chamber and normally assuming a position of closing the passage between the main chamber and the corridor, a rigid platform in the corridor adjacent the entrance and overlying a portion of the treadle, a second treadle pivoted in the main chamber adjacent one end of the inclined ramp where the latter connects with the main chamber, frame members secured to the pivoted end of the second treadle and straddling the corridor, a closure for the entrance carried by said frame members, and a trip arm formed on one end of the first treadle and having a laterally offset end to provide a foot to engage under the closure for releasably securing said closure in an open position.

ANDREW S. FLOWERS.